Oct. 28, 1958  R. C. W. TINGLEY  2,857,950
REMOVABLE BLIND FASTENER WITH PIVOTED SECURING LEGS
Filed Oct. 1, 1956  2 Sheets-Sheet 1

INVENTOR
R. TINGLEY
BY: Maybee & Legris
ATTORNEYS

INVENTOR
R. TINGLEY
BY: Maybee & Legris
ATTORNEYS

United States Patent Office 2,857,950
Patented Oct. 28, 1958

2,857,950
REMOVABLE BLIND FASTENER WITH PIVOTED SECURING LEGS

Richard Charles Walter Tingley, Willowdale, Ontario, Canada, assignor to Avro Aircraft Limited, Malton, Ontario, Canada, a corporation Application October 1, 1956, Serial No. 613,080

3 Claims. (Cl. 151—41.7)

This invention relates to blind fasteners which are commonly fitted to an inaccessible side of a light sheet metal structure to enable threaded bolts to be secured thereto.

Blind fasteners of this type are very commonly used in aircraft maintenance and repair. In aircraft, for example, inspection panels are secured over openings in the skin by means of countersunk bolts which are received in anchor nuts which are riveted or otherwise secured to the inaccessible side of the skin around a bolt hole in the skin. Such anchor nuts are often fitted to the skin in such a manner that, after completion of the assembly of the aircraft they are inaccessible by reason of their being situated in "blind" spots such as in box spars or behind stiffening webs or other airframe structure.

The anchor nut threads often become stripped by reason of cross-threading or other abuse during the frequent removal and replacement of the inspection panels during the servicing of the aircraft.

Certain well known replacement fasteners may be used to replace these worn anchor nuts but, in the main, these can only be fitted once and further damage may require a major repair.

Accordingly, it is an object of the present invention to provide a fastener which may be fitted in blind spots from the exterior of the structure and secured in place therefrom.

It is a further object of the invention to provide such a fastener which may itself be readily removed and replaced without damaging the component in which it is mounted.

Further objects and advantages of the invention will become apparent from the description of a preferred embodiment of the invention which comprises a body portion having at one end a threaded bolt receiving aperture coaxial therewith, a diametrically oriented web extending axially from the other end, a pair of legs pivotally secured to the web and rotatable from a first position parallel to the longitudinal axis of the body portion to a second position in which they extend laterally from the body portion, each leg having a threaded bolt receiving aperture therein.

Referring now to the accompanying drawings in which like reference numerals refer to like parts in the various views and in which.

Figure 1:
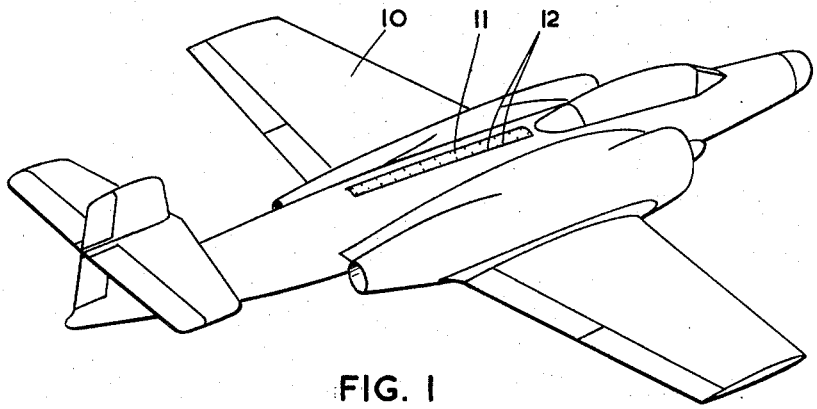
Figure 1 is a perspective view of an aircraft embodying the invention.

An aircraft 10 is shown in Figure 1 to be provided with an inspection panel 11 along the backbone of the airframe which is secured over an elongated opening by means of screws 12 which are received in the fasteners of the present invention.

Referring now to the remaining figures in the drawings the fastener of the present invention may be seen to comprise a body 20 of cylindrical external configuration which carries, at one end, a web 21 which lies along a diameter of the body 20 and extends axially therefrom. The web 21 is of a thickness equal to approximately one-third the diameter of the body 20 and, accordingly, shoulders 22 and 23 lie adjacent the web 21 on the body 20, each shoulder being of a maximum width equal to approximately one-third the diameter of the body 20.

The body 20, at the end remote from the web 21 is provided with a coaxial drilling 24 of a depth less than the length of the body 20. Seated in the drilling 24 and in abutment with the bottom wall 25 thereof is a resilient annulus 26 which may conveniently be made from a material such as is sold under the trade name nylon or Teflon. The axial length of the annulus 26 is approximately equal to one-half the depth of the drilling 24. Also seated in the drilling 24 and in abutment with the edge of the annulus 26 remote from the bottom 25 of the drilling is a metallic annulus 27 which is provided with internal screw threads. The axial length of the annulus 27 is such that when it is seated in abutment with the upper edge of the annulus 26 the opposite side of the annulus 27 lies flush with the end 28 of the body 20. The annulus 27 is secured within the drilling 24 in the body 20 by means of welding, brazing or other means so that it cannot rotate relative to the body. The internal diameter of the annulus 26 is slightly smaller than the mean internal diameter of the threaded annulus 27 so that when a bolt 29 (Figure 5) is threaded into the annulus 27, the lower end 29a of the bolt will be tightly gripped by the resilient annulus and held against loosening due to vibration which may be set up in the structure.

The web 21 is radiused at its free end 21a and a hole is drilled laterally through the web at the centre of curvature of the radiused end. Through this hole is passed a pin 30 about which are pivoted a pair of legs 31 and 32.

Figure 4:
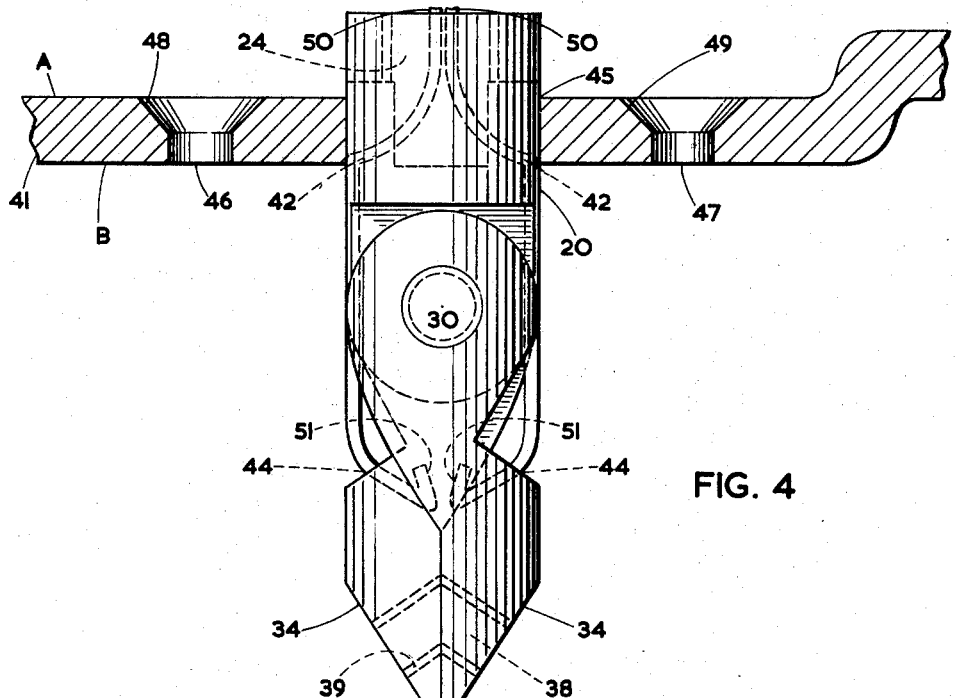
Figure 4 is a side elevation of the fastener in the initial stage of installation.

Each leg 31 and 32 has an external surface which is a segment of a cylinder of a diameter equal to the diameter of the body member 20. Thus, when each leg 31 and 32 occupies a position in which its longitudinal axis is parallel to the longitudinal axis of the body member 20 the entire assembly, the body member and both legs, will lie within the confines of a cylinder, the diameter of which is equal to the diameter of the body member 20 and the length of which is equal to the combined length of the body 20 and the legs 31 and 32 (Figures 2, 3 and 4).

Figures 2, 3:
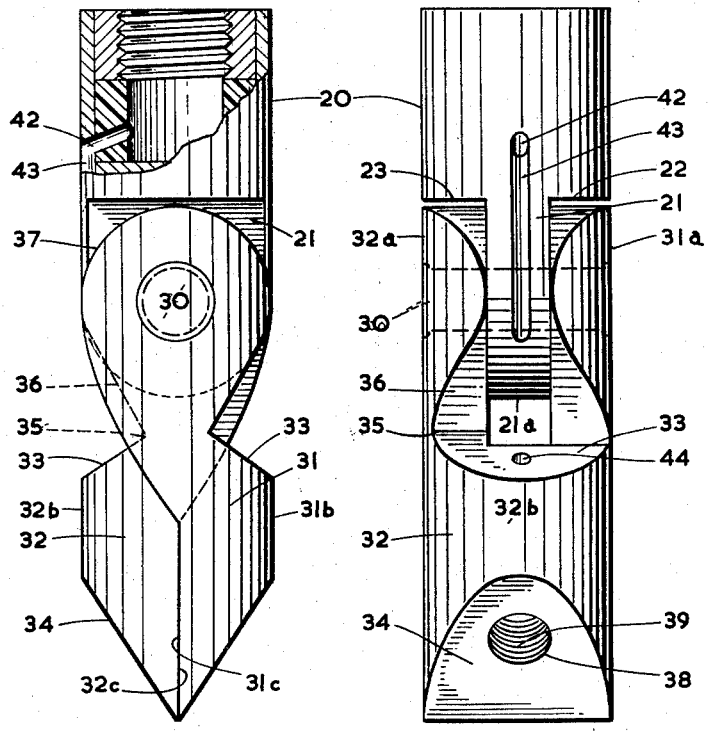
Figure 2 is a side elevation of the blind fastener, partly cut away.
Figure 3 is a side elevation of the blind fastener taken at 90° to the view of Figure 2.

Referring now in particular to Figure 3 it will be seen that leg 32 is provided with an upper portion 32a through which the pin 30 passes to pivot it to the web 21. The maximum thickness of the upper leg portion 32a is equal to the width of the shoulder 23 so that the surfaces of the body 20 and upper leg 32a at this point are flush with one another. Lower portion 32b of the leg 32 lies at an angle of 90° to the portion 32a and is provided with two shoulders or faces 33 and 34 which lie at an angle of 90° to one another. Shoulder 33, as can be seen from Figure 2 commences at the surface 32b of the leg 32 and terminates at point 35 where it intersects with surface 36 of the upper portion 32a of the leg. Surface 36 is substantially a tangent line extending from the upper circular surface 37 of the leg, the centre of curvature of the circular surface 37 being the centre of pin 30.

Considering the action of leg 32 alone it will be observed (Figures 4 and 5) that if leg 32 is pivoted in a clockwise direction about pin 30, shoulder 33 will ultimately come to rest against the cylindrical surface of the body member 20. In view of the fact that surface 33 lies at an angle of 90° to surface 34 it will be seen that surface 34 will then extend laterally from the body member 20 at an angle of 90° from the longitudinal axis of the body member. This can be clearly seen in Figure 5 where leg 32 is shown as having been pivoted from the position shown in Figure 2 to the second position in which the leg extends laterally from the body. Surface 33 is lying in abutment with the external surface of the body member 20 and surface 34 extends at an angle of 90° from the longitudinal axis of the body.

Leg 31 is of identical construction to leg 32 except that it is of opposite hand. In other words in viewing the structure shown in Figure 3 it will be seen that lower portion 32b of the leg 32 extends at 90° from portion 32a of the leg in a direction (in Figure 3) which is to the right of the portion 32a. Obviously, the equivalent portion 31b of leg 31 will extend to the left of portion 31a of leg 31 at an angle of 90° thereto. Accordingly, surfaces 31c and 32c of legs 31 and 32 will abut one another when the legs are in the position shown in Figures 2 and 3 to align the legs with their longitudinal axes parallel to the longitudinal axis of the body member.

Figure 5:
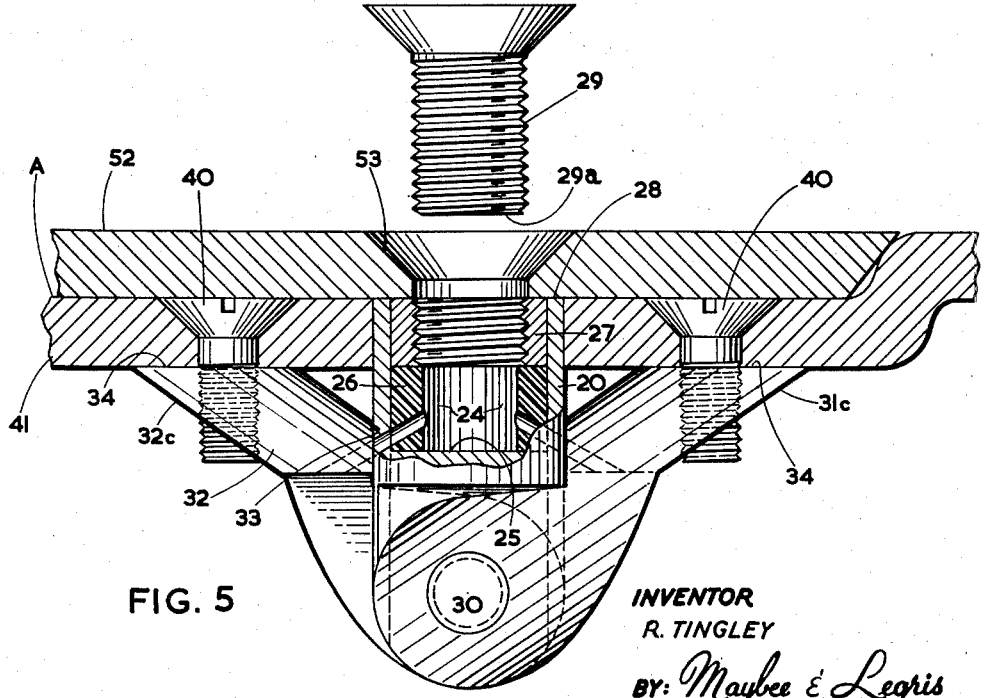
Figure 5 is a side elevation partly in section of an installed fastener.

Referring now to Figures 3 and 5 it will be seen that face 34 of each leg is provided with a hole 38 which in the embodiment illustrated carries internal screw threads 39. An alternative structure contemplated by this invention includes smooth bore holes 38 with which blind rivets or other suitable fastening means may be employed. The axis of the hole 38 is normal to the surface of face 34 so that when the legs are occupying the position shown in Figure 5 bolts 40 may be passed through a structure 41 and engage with the threaded holes 38 in each of the legs 31 and 32. Similarly, of course, if the holes 38 do not have screw threads 39, blind rivets or other suitable means may be employed in a like manner.

Referring now to Figures 3, 4 and 5 it will be seen that holes 42 are drilled through the cylindrical body member 20 at an angle to the longitudinal axis of the body member, both the holes lying in a plane which also contains the web 21 so that the ends of the holes within the drilling 24 are closer to the end 28 of the body member than are the other ends thereof. On the external surface of the body member 20 and the edges of the web 21 is provided a groove 43 which leads, at one end, to the holes 42 and, at the other end, gradually fairs into the radiused portion 21a of the end of web 21. Similarly, holes 44 are provided in the shoulder 33 of each of the legs 31 and 32 and pass completely through the legs.

Referring now to Figure 4, the method of installing the fastener of the present invention in a structure will be described in detail. A sheet metal member 41 may be considered to be accessible on the side indicated by the reference character A and inaccessible on the side indicated by the reference character B. A hole 45 is provided in the sheet 41 of a diameter very slightly larger than the diameter of the body portion 20 of the fastener. Holes 46 and 47 have been drilled through the sheet 41 and have been countersunk at 48 and 49 on the accessible side of the sheet. The blind fastener has been prepared for installation on the sheet 41 by passing a pair of wires 50 into the coaxial drilling 24 at one end of the body. One wire 50 passes outwardly from the drilling 24 to the external side of the body 20 through each of the holes 42. Each wire then passes axially along the external surface of the body 20 within the groove 43 associated with each of the holes 42. The end of the wire is inserted through hole 44 in the shoulder 33 of each leg and the end 51 of each wire is then crimped or bent over as shown in Figure 4 to engage the leg through which it passes. The fastener is then passed through the hole 45 in the sheet as shown in Figure 4 and tension is applied to the wire 50. The wires are sufficiently flexible to enable them to be drawn through the holes 42 in the body and, accordingly, each wire 50 will pivot the leg to which it is secured by the crimped end 51, about the pin 30 until the shoulder 33 on each leg abuts the cylindrical external surface of the body member 20. At this point the surfaces or shoulders 34 of each leg will be extending laterally from the body in a direction which is normal to the longitudinal axis of the body member 20. Holes 46 and 47 have been so positioned that they will be aligned with the holes 38 in each of the shoulders 34 and, accordingly, bolts 40 may be passed through the apertures 46 and 47 and engaged with the threaded holes 38 in each of the bearing faces 34 of the legs.

When the bolts 40 have engaged the first few threads in holes 38 or, in the case of smooth bore holes 38 and blind rivets, when the blind rivets have been expanded sufficiently to hold the legs 31 and 32, the wires 50 are pulled free of the fastener and removed. The bolts 40 or blind rivets may then be tightened down.

When the bolts 40 have been securely tightened down in their threaded apertures the fastener will be occupying the position shown in Figure 5. The end 28 of the body member will lie flush with the accessible surface A of the sheet 41, the length of the body having been determined previously in accordance with the thickness of the material with which it is to be used. If the end 28 of the body member extends slightly above the surface A of the sheet 41 it can be ground or filed down until it lies perfectly flush; it is of no consequence if it is slightly beneath the surface A of the sheet 41.

In order to secure a member 52 which may conveniently be an inspection panel, as indicated in Figure 1, to the sheet 41 it is merely necessary that the panel be placed over the blind fastener in such a manner that the countersunk aperture 53 in the member 52 lies over the threaded bolt receiving aperture in the end of the body member 20 and the bolt 29 tightened down in the fastener.

In some locations, the installation of the fastener will be rendered difficult due to there being an obstruction in the path of the arcuate movement of one of the legs. In such instances the fastener may be installed by using only one leg, the leg which is used being adequate to support the fastener in conjunction with the edge of hole 45 which bears against the side wall of the fastener body. In practice it may be found that such occurrences are sufficiently frequent to justify the manufacture of fasteners made in accordance with this invention which are provided with only one leg.

If the threads in the annulus 27 should become damaged to the point where the fastener becomes inoperative it is merely necessary that the bolts 40 or other fasteners be removed to release the legs 31 and 32 and the fastener withdrawn from its position secured to sheet 41. By repeating the process with a replacement fastener the assembly can be rendered operative once more. It is also possible that the bushing 27 may be removed from the body member 20 and replaced by a new bushing thereby enabling a fastener itself to be repaired with the consequent saving in maintenance cost.

It will be apparent from the above description that the objects set forth earlier in this specification have been attained by the present invention. The invention has been described in detail with reference to a particular embodiment and it is intended that this description shall be construed as illustrative rather than limiting. Minor modifications may be made in the structure disclosed without departing from the spirit of the invention or the scope of the appended claims.

What I claim as my invention is:

1. A blind fastener comprising a cylindrical body portion having, at one end, a threaded bolt receiving aperture coaxial therewith, comprising an axial hole in the body, a resilient annulus seated in the bottom of the hole and an internally threaded rigid annulus abutting the edge of the annulus remote from the bottom of the hole and secured to the wall of the hole against rotation relative thereto, the internal diameter of the resilient annulus being slightly less than the mean internal diameter of the threaded annulus, a web lying along a diameter of the body at the other end and extending axially from the body, a pair of legs pivotally secured to the web and movable from a first position parallel to the axis of the body portion and extending away from the bolt receiving aperture to a second position extending laterally from the body portion, a first shoulder on each leg to abut with the opposite leg to position the two legs in the first position and a second shoulder on each leg to abut the body portion to position the legs in the second position, a bearing face on each leg which, in the second position lies at right angles to the longitudinal axis of the body portion, a threaded bolt receiving aperture in each bearing face and means to move the legs from the first position to the second position.

2. A blind fastener as claimed in claim 1 in which the bearing face on each leg, in the second position, faces that end of the body portion remote from the web to which the legs are pivoted.

3. A blind fastener as claimed in claim 1 in which the diameter of the legs when in the first position parallel to the axis of the body is not greater than the diameter of the cylindrical body portion.

References Cited in the file of this patent

UNITED STATES PATENTS

| 1,391,661 | Armstrong | Sept. 27, 1921 |
| 1,915,509 | Adam | June 27, 1933 |
| 2,132,284 | Bonham | Oct. 4, 1938 |
| 2,673,002 | Stevens | Mar. 23, 1954 |

FOREIGN PATENTS

| 19,610 | Great Britain | Oct. 18, 1893 |
| 172,223 | Great Britain | Dec. 10, 1920 |
| 212,370 | Great Britain | Oct. 27, 1923 |
| 612,745 | France | Oct. 29, 1926 |